US011948759B1

(12) United States Patent
Way et al.

(10) Patent No.: US 11,948,759 B1
(45) Date of Patent: Apr. 2, 2024

(54) POWER CONTROL APPARATUS AND METHOD

(71) Applicant: BUSTER AND PUNCH LIMITED, Stamford (GB)

(72) Inventors: Rory John Geoffrey Way, Somersham (GB); Ivan Andrew Drake, London (GB)

(73) Assignee: BUSTER AND PUNCH LIMITED, Cambridgeshire (GB)

( * ) Notice: Subject to any disclaimer, the term of this patent is extended or adjusted under 35 U.S.C. 154(b) by 0 days.

(21) Appl. No.: 17/952,522

(22) Filed: Sep. 26, 2022

(51) Int. Cl.

| | |
|---|---|
| ***H01H 19/63*** | (2006.01) |
| ***H01H 19/14*** | (2006.01) |
| ***H01H 25/06*** | (2006.01) |
| ***H05B 47/10*** | (2020.01) |

(52) U.S. Cl.
CPC ............ *H01H 19/63* (2013.01); *H01H 19/14* (2013.01); *H01H 25/06* (2013.01); *H05B 47/10* (2020.01)

(58) Field of Classification Search
CPC ........ H01H 19/00; H01H 19/14; H01H 25/00; H01H 25/06; H01H 19/63; H01H 1/00; H01H 1/02; H01H 1/06; H01H 1/12; H01H 1/14; H01H 3/00; H01H 3/08; H01H 3/10; H01H 3/32; H01H 3/40; H01H 3/54; H01H 19/02; H01H 19/20; H01H 2003/08; H01H 2221/00; H01H 2221/01; H05B 47/00; H05B 47/10
USPC ........................................................ 200/11 R
See application file for complete search history.

(56) References Cited

U.S. PATENT DOCUMENTS 3,864,561 A * 2/1975 Spira .................... H01H 19/025
362/95
6,732,438 B2 * 5/2004 Enzinna ................. G01D 5/165
33/534
7,891,902 B2 * 2/2011 Pettey ....................... F16C 3/00
403/313

* cited by examiner

*Primary Examiner* — Anthony R Jimenez
(74) *Attorney, Agent, or Firm* — NIXON & VANDERHYE P.C.

(57) ABSTRACT

Apparatus, use and a method for controlling an output power provided to at least one electrical component are described. The apparatus includes at least one module with at least one electronic circuit for providing an output power, adjustable via rotation of at least one rotary element, to at least one electrical component when the electronic circuit is electrically connected to an input power supply that supplies power to the electronic circuit. At least one first switching element is configured to electrically disconnect at least one of the at least one electronic circuit from the input power supply when the first switching element is in a first predefined state. At least one actuator element that is rotatable between a first position and a second position is configured to switch a respective first switching element to the first predefined state when rotated from the first position to the second position.

19 Claims, 22 Drawing Sheets

POWER CONTROL APPARATUS AND METHOD

BACKGROUND

The present invention relates to apparatus and a method for controlling the output power provided to at least one electrical component such as a light source. In particular, but not exclusively, the present invention relates to a rotary dimmer switch including electronic circuitry that can provide adjustable output power to a light source, whereby rotating an actuator element within the dimmer switch from a first position to a second position changes the state of a microswitch in the dimmer switch which thereby causes an electrical connection between the circuitry and an input power supply to be broken.

Electrical components that receive the power needed for them to operate from a source external to the component are known. For example, light sources (such as incandescent bulbs, LEDs or the like), speakers and the like are often provided with power from a source external to the electrical component. In order to control the output power being provided to such electrical components, switches are commonly used. For example, these may be toggle switches which typically have a predefined 'on' and 'off' state and can therefore instantaneously change the output power provided to the electrical component between a zero value and a predefined non-zero value. Alternatively, dimmer switches can be used which allow the output power provided to the component to be continuously adjusted between a zero value and a predefined non-zero value. Dimmer switches are commonly provided in two types, slidable dimmer switches and rotary dimmer switches. In slidable dimmer switches, a slider is used to adjust the output power provided to the component. In rotary dimmer switches, a rotary element is used to adjust the output power provided to the component.

During normal use, electrical circuitry (that is configured to provide the adjustable output power to the electrical component) within a module of a dimmer switch is always provided with power from an input power supply. This is the case even when the adjustable output power of the dimmer switch is set to a value of zero. Therefore, for dimmer switches in certain jurisdictions, legal testing requirements often specify that all dimmer switches must have a separate switch that can disconnect input power from the circuitry that provides the adjustable output power to an electrical component (to isolate the circuit to the bulbs or lights for their installation/removal). For example, in the US, testing requirement UL 1472 requires such a separate switch. To date, these separate switches have been provided in the form of a separately actuatable switch on a front user-facing cover of the dimmer switch. Such a separate switch is however unsightly and can spoil the aesthetic appearance of the dimmer switch. Nevertheless, in view of testing requirements such as UL 1472, it has to date been thought that such a switch on a front-facing cover is a necessity for a dimmer switch. It is also noted that having such a separate switch on a front-facing cover of the dimmer switch is prone to accidental actuation by a user when they are using the main dimmer mechanism.

Furthermore, including multiple front-facing switches on a dimmer switch can make assembly of the dimmer switch more difficult.

SUMMARY

It is an aim of the present invention to at least partly mitigate one or more of the above-mentioned problems.

It is an aim of certain embodiments of the present invention to help provide a rotary dimmer switch which has a separately actuatable switch for breaking an electrical connection between an input power supply and the circuitry of the dimmer switch.

It is an aim of certain embodiments of the present invention to help provide a separate switch within a dimmer module of a dimmer switch that can disconnect electrical power from the circuitry of the dimmer module and that is not visible to a user during normal use.

It is an aim of certain embodiments of the present invention to provide a rotary dimmer switch which has three functions (on/off functionality, adjustable power functionality, separate switch input power interruption functionality) that can be separately used via a common rotatable component.

It is an aim of certain embodiments of the present invention to help provide a hidden microswitch within a rotary dimmer switch that can be actuated by rotating the same component used to adjust the output power of the dimmer switch.

It is an aim of certain embodiments of the present invention to help provide a dimmer switch with a separate switch that can break an electrical connection between an input power supply and circuitry within the dimmer switch and that has a reduced likelihood of accidental actuation.

According to a first aspect of the present invention there is provided apparatus for controlling an output power provided to at least one electrical component, comprising: at least one module comprising at least one electronic circuit for providing an output power, adjustable via rotation of at least one rotary element, to at least one electrical component when the electronic circuit is electrically connected to an input power supply that supplies power to the electronic circuit; at least one first switching element configured to electrically disconnect at least one of said at least one electronic circuit from the input power supply when the first switching element is in a first predefined state; and at least one actuator element that is rotatable between a first position and a second position and that is configured to switch a respective first switching element to the first predefined state when rotated from the first position to the second position.

Aptly, the apparatus further comprises at least one rotatable elongate shaft element that is engageable with a respective actuator element; wherein the actuator element is rotatable by rotating the rotatable elongate shaft element after engagement of the rotatable elongate shaft element with the actuator element.

Aptly, the actuator element is configured to switch the respective first switching element to a second predefined state, in which the first switching element is configured to electrically connect the input power supply to at least one of said at least one electronic circuit, when rotated from the second position to the first position.

Aptly, in the first position, the actuator element is configured to make contact with the respective first switching element.

Aptly, in the second position, the actuator element is configured to make contact with the respective first switching element.

Aptly, an angular displacement between the first position and the second position is around 20-70 degrees.

Aptly, the angular displacement is around 35-45 degrees.

Aptly, the angular displacement is around 39 degrees.

Aptly, the rotatable elongate shaft element is rotatable by rotating a rotatable knob element connectable to the rotatable elongate shaft element.

Aptly, the rotatable elongate shaft element is configured to engage the actuator element upon application of a first predetermined axial force to the rotatable elongate shaft element.

Aptly, the first predetermined axial force is applied to the rotatable elongate shaft element via a rotatable knob element connectable to the rotatable shaft element.

Aptly, the first predetermined axial force is a force of from 10-30 N.

Aptly, the first predetermined axial force is a force of from 17-21 N.

Aptly, the rotatable elongate shaft element comprises a main body portion comprising a first end and a further end.

Aptly, the rotatable elongate shaft element further comprises a plurality of first engaging teeth members arranged around an outer surface of the first end of the main body portion.

Aptly, the first end of the main body portion is opposite the further end of the main body portion that is connectable to a rotatable knob element.

Aptly, the first plurality of engaging teeth members extend by a predetermined distance beyond an end surface of the first end of the main body portion in a direction towards the actuator element.

Aptly, the plurality of first engaging teeth members are chamfered at an end of the first engaging teeth members which faces the actuator element.

Aptly, the rotary element is a rotatable control shaft of at least one rotary encoder element comprised within the electronic circuit; and an end surface of the first end of the main body portion comprises a recess sized and shaped to mate with a correspondingly sized and shaped rotatable control shaft of the rotary encoder element.

Aptly, the apparatus further comprises a resilient biasing element disposed in the recess between the rotatable control shaft and the main body portion.

Aptly, the resilient biasing element is configured to bias the rotatable elongate shaft element away from the actuator element.

Aptly, the resilient biasing element is a compressive spring.

Aptly, the rotatable control shaft is rotatable by rotating the rotatable elongate shaft element.

Aptly, the apparatus further comprises a second switching element disposed within the rotary encoder element that is configured to set the adjustable output power to zero when the second switching element is in a first predetermined state and to set the adjustable output power non-zero when the second switching element is in a second predetermined state.

Aptly, the second switching element is switchable from the first predetermined state to the second predetermined state upon application of a second predetermined axial force to the rotatable elongate shaft element.

Aptly, the second predetermined axial force is less than a first predetermined axial force needed for the rotatable elongate shaft element to engage the actuator element.

Aptly, the second predetermined axial force is a force of from 2-9 N.

Aptly, the second predetermined axial force is a force of from 5-6 N.

Aptly, the second predetermined axial force is applied to the rotatable elongate shaft element via a rotatable knob element connectable to the rotatable elongate shaft element.

Aptly, when the second switching element is in the second predetermined state, rotation of the rotatable elongate shaft element changes the adjustable output power.

Aptly, the second switching element is a tactile switch.

Aptly, the second switching element comprises a button that is depressed upon application of a second predetermined axial force to the rotatable elongate shaft element.

Aptly, the actuator element comprises a ring portion.

Aptly, the ring portion comprises a second plurality of engaging teeth members arranged around an inner surface of the ring portion.

Aptly, the plurality of second engaging teeth members are radiused and/or chamfered at an upper end of the second engaging teeth members which faces the rotatable elongate shaft element.

Aptly, the actuator element further comprises a body portion that extends away from the ring portion in a radial direction.

Aptly, the body portion comprises a riding surface configured to contact the first switching element when the actuator element is in the first position or second position.

Aptly, a depth between a top surface of the body portion and the riding surface increases between a first side and a second side of the body portion.

Aptly, the riding surface comprises an inclined region inclined at an angle of 0 to 25 degrees with respect to the top surface such that a first edge of the riding surface closest to the ring portion is closer to the top surface than a second edge of the riding surface furthest from the ring portion.

Aptly, the inclined region is inclined at an angle of 0 to 14 degrees.

Aptly, the actuator element further comprises at least one arm element connected at an end surface of the body portion opposite to the ring portion.

Aptly, the arm element is configured to abut a surface of a front plate element to thereby apply a predetermined force to the first switching element when the actuator element is in the first position or second position.

Aptly, the arm element comprises a sloped pathway portion that extends beyond a top surface of the body portion and a curved connecting portion connected to the sloped pathway portion.

Aptly, the curved connection portion has a rounded outer surface which abuts the front plate element.

Aptly, the arm element is of a substantially inverted V-shape.

Aptly, the first switching element is a microswitch.

Aptly, the first switching element comprises a button that is depressible by the actuator element when in the first position or second position.

Aptly, the apparatus is a dimmer switch and wherein the electronic component is a light source.

Aptly, the apparatus further comprises a housing comprising a front plate element and a casing with an open end, wherein the front plate element is securable to the open end of the casing to thereby close the housing, and wherein the housing at least houses the module, the actuator element and the first switching element.

Aptly, the elongate shaft element extends from an area inside the housing to an area outside the housing through the front plate element.

Aptly, the casing comprises at least one first electrical connector electrically connectable to the input power supply and to at least one input power connector element, of the module, that is electrically connected to the electronic circuit.

Aptly, the first switching element is electrically disposed between the first electrical connector and the input power connector element.

Aptly, the casing comprises at least one second electrical connector electrically connectable to an output power supply, that supplies power to the electrical component, and to at least one output power connector element, of the module, that is electrically connected to the electronic circuit.

According to a second aspect of the present invention there is provided a method for controlling an output power provided to at least one electrical component, the method comprising the steps of: rotating an actuator element from a first position to a second position; and responsive to the rotating, switching a first switching element to a first predefined state; and responsive to the switching, electrically disconnecting an input power supply from at least one electronic circuit that is configured to provide an output power, adjustable via at least one rotary element, to at least one electrical component.

Aptly, the method further comprises prior to rotating the actuator element, applying a first predetermined axial force to a rotatable elongate shaft element, and thereby engaging the rotatable elongate shaft element with the actuator element; and upon engagement of the rotatable elongate shaft element with the actuator element, rotating the actuator element from the first position to the second position.

Aptly, electrically disconnecting comprises breaking an electrical connection between the input power supply and the electronic circuit.

Aptly, rotating comprises rotating the actuator element by around 20-70 degrees.

Aptly, rotating comprises rotating the actuator element by around 35-45 degrees.

Aptly, rotating comprises rotating the actuator element by 39 degrees.

According to a third aspect of the present invention there is provided use of the apparatus according to the first aspect of the present invention.

Certain embodiments of the present invention help provide a rotary dimmer switch that has a rotatable knob but no separately actuatable switch on a front user-facing cover of the dimmer switch.

Certain embodiments of the present invention help provide a rotary dimmer switch that satisfies US testing requirement UL 1472.

Certain embodiments of the present invention help provide a digital rotary dimmer switch including a microswitch, hidden behind a front plate of the dimmer switch, that can prevent input power from reaching the electrical circuitry of the dimmer switch when the microswitch is in a certain state.

Certain embodiments of the present invention help provide a dimmer switch that is more straightforward to assemble than certain conventional dimmer switches.

BRIEF DESCRIPTION OF THE DRAWINGS

Embodiments of the present invention will now be described hereinafter, by way of example only, with reference to the accompanying drawings in which.

DETAILED DESCRIPTION

Figure 1:
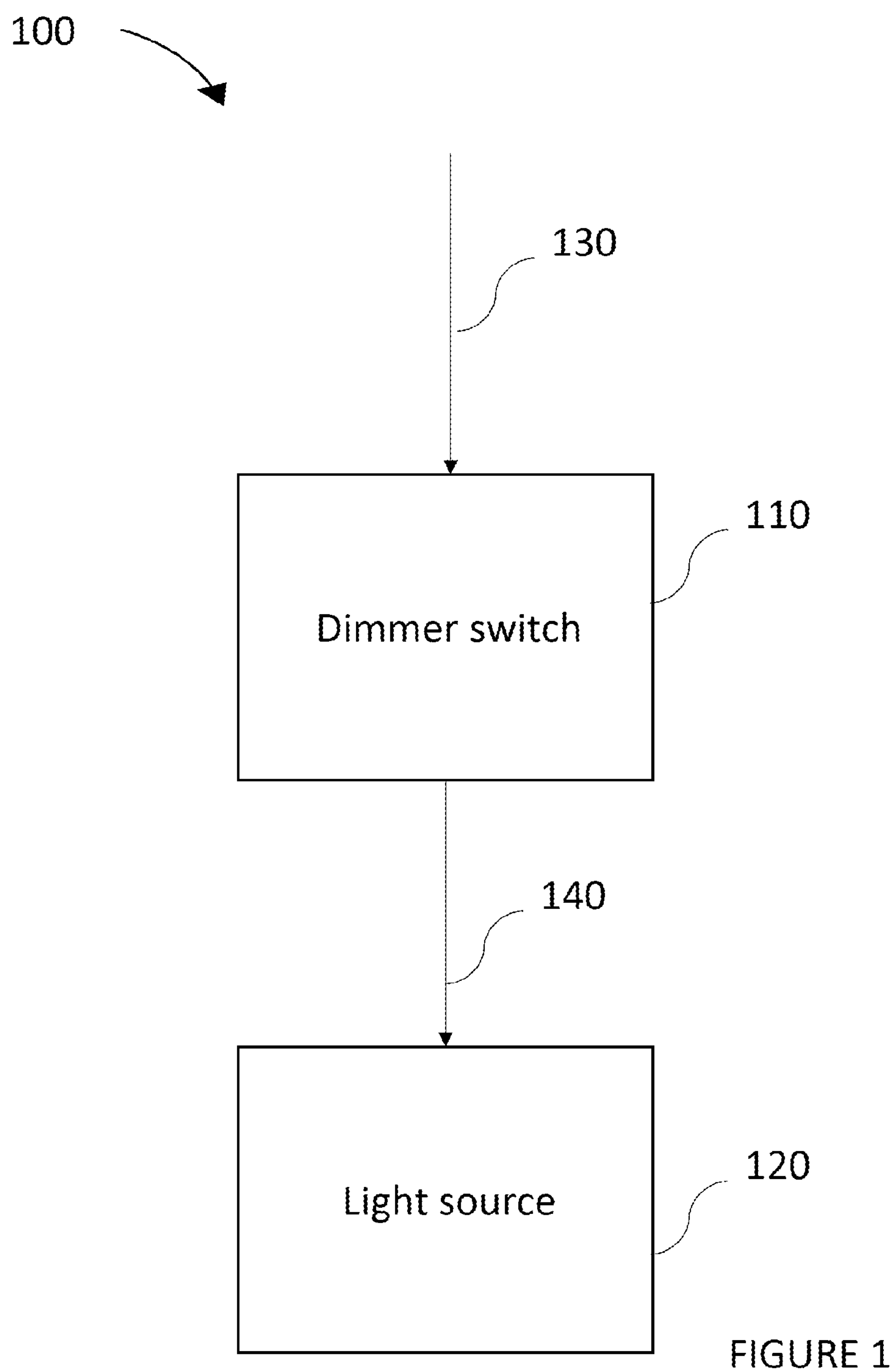
FIG. 1 illustrates a lighting system.

In the drawings like reference numerals refer to like parts.

FIG. 1 illustrates a lighting system including a dimmer switch 110 and a light source 120. A dimmer switch is an example of apparatus that controls output power provided to an electrical component. The light source may be an incandescent bulb or an LED although it will be appreciated by a person of skill in the art that other types of light sources may be used. In use, an input power supply 130 may be provided to the dimmer switch. The input power supply may be in the form of one or more cables. The cables may originate from a consumer unit or the like. Depending on a state of the dimmer switch, output power may be provided to the light source via an output power supply 140. The output power supply may be provided in the form of one or more cables between the dimmer switch and the light source. If output power is supplied to the light source, the light source may irradiate light. The brightness of the light irradiated by the light source can be controlled by rotating a rotatable knob on the dimmer switch 110. Whilst the dimmer switch shown in FIG. 1 is configured to provide output power to only a single light source, it will be appreciated that in certain other embodiments of the present invention a single dimmer switch with a single rotatable knob may control the output power provided simultaneously to multiple light sources. It will also be appreciated that a dimmer switch may also include multiple rotatable knobs, where rotation of each knob controls the output power provided to a respective set (one ore more) of light sources. The dimmer switch shown in FIG. 1 is a digital dimmer switch where the output power is controlled via controlling the duty cycle of a pulse width modulated signal as will be appreciated by a person of skill in the art. However, in certain other embodiments of the present invention the dimmer switch may be an analogue (i.e., 1-10V) dimmer switch.

Figure 2:
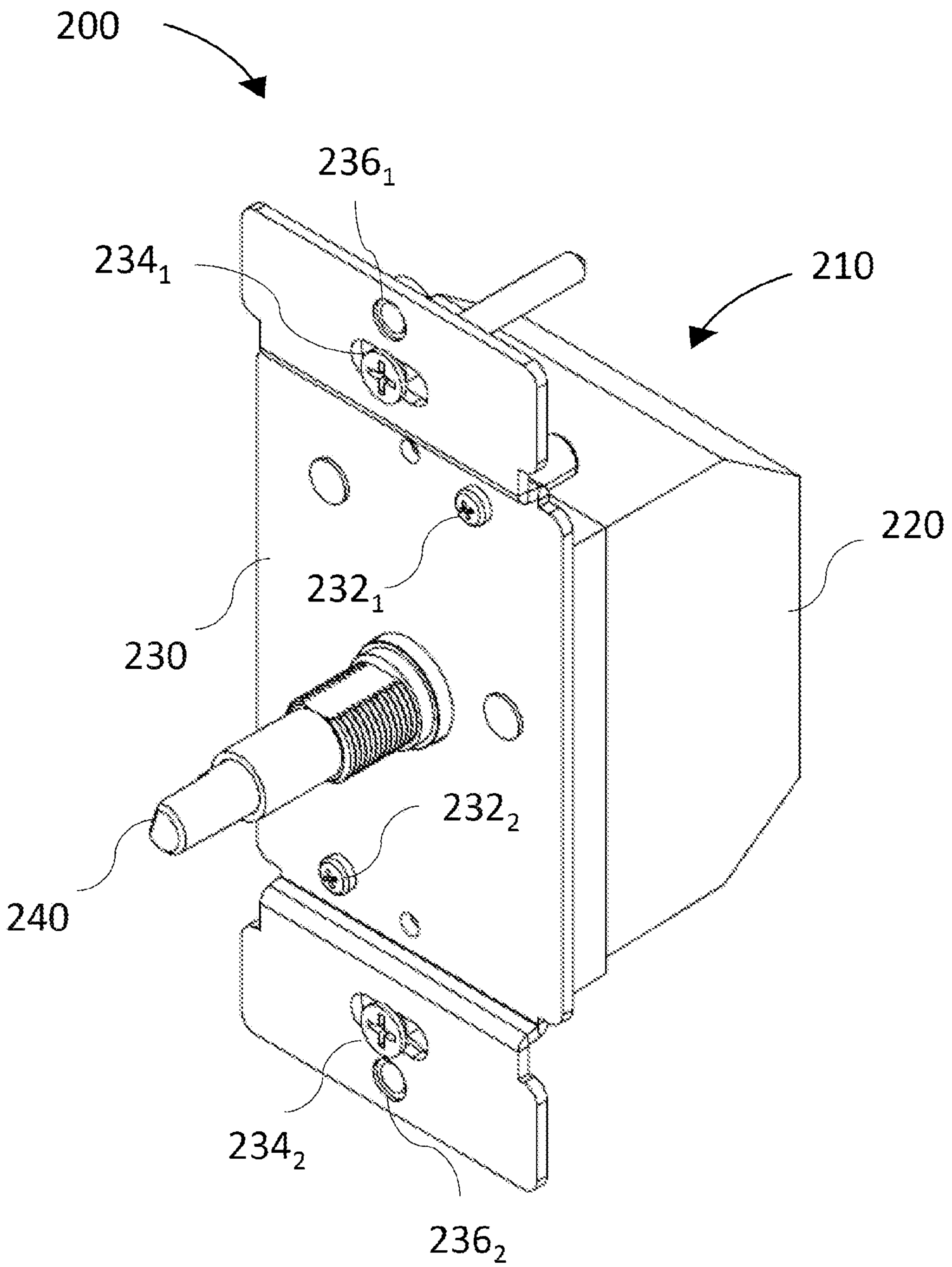
FIG. 2 illustrates a perspective view of a dimmer module of a dimmer switch.

FIG. 2 illustrates a dimmer module 200 of a dimmer switch. The dimmer switch may be the dimmer switch as shown in FIG. 1. The dimmer module is another example of apparatus that is able to control the output power that is supplied to an electrical component such as a light source. Particularly, the dimmer module controls the average output power that is provided to a light source over a predetermined period of time. The dimmer module 200 includes a housing 210. The housing has a casing 220 with an open end (shown in FIG. 5) and a front plate element 230 that is securable to the casing. The casing is secured to the front plate element via self-tapping screws $232_1$, $232_2$ that pass through apertures (not shown) in the front plate element and are secured into openings (not shown) of the casing. Other means of securing the casing to the front plate element may of course be used. Between the casing and the front plate element there is an internal chamber that houses certain components of the dimmer module. These components are discussed in more detail with reference to FIG. 5. An elongate shaft element 240 extends through the front plate element such that a first end of the elongate shaft element is inside the housing and a further end of the elongate shaft element is outside the housing. The elongate shaft element 240 is rotatable and is able to control the position of a rotary element associated with a rotary encoder element in order to adjust the output power from the dimmer module. The elongate shaft element is rotated via a rotatable knob (shown in FIG. 4) secured to the further end of the elongate shaft element. It will be appreciated that whilst the dimmer module of FIG. 2 has only one rotatable shaft element, dimmer modules according to certain other embodiments may include more than one elongate shaft element such that the output power provided to multiple light sources can be independently controlled via rotating a respective elongate shaft element. It will also be appreciated that a single dimmer switch may include multiple dimmer modules as shown in FIG. 2. The dimmer module 200 may be fixed to a backbox using screws $234_1$, $234_2$ although it will be appreciated that other fixing means may be utilised. The dimmer module 200 also includes openings 236, 236 in the front plate element which can be used to enable a cover to be secured over the dimmer module.

Figure 3:
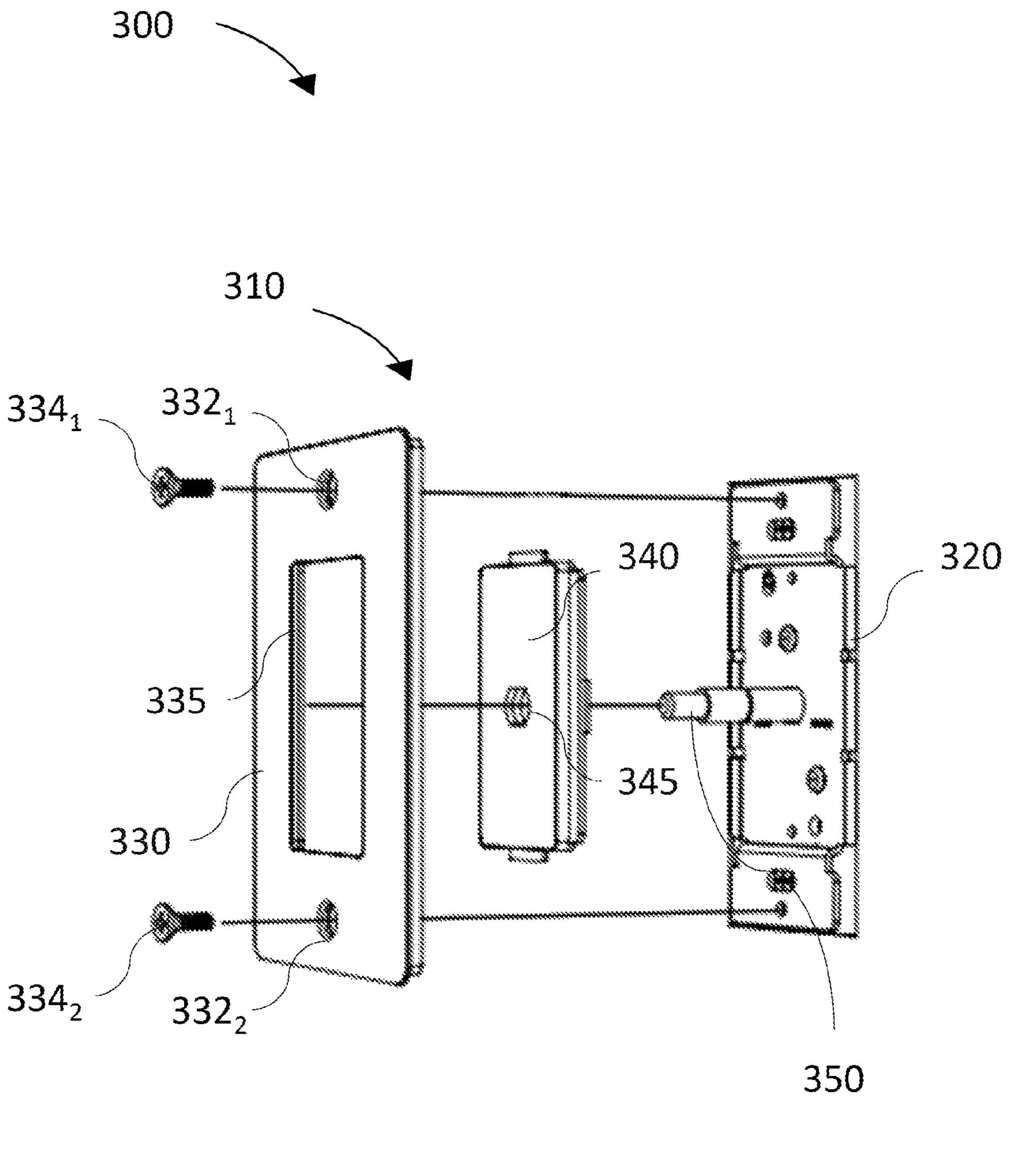
FIG. 3 illustrates an exploded view of how a front cover is arranged on a front plate of a dimmer module of a dimmer switch.

FIG. 3 illustrates an arrangement 300 of a front cover 310 over the front plate element 320 of a dimmer module. The front plate element may be the front plate element as illustrated in FIG. 2. As illustrated in FIG. 3, the front user-facing cover 310 includes two separate components. That is to say a cover plate 330 and an infill plate 340. Of course, a unitary cover may be provided according to certain other embodiments of the present invention. As is shown in FIG. 3, the infill plate 340 includes a hole 345 that is provided over the elongate shaft element 350. The cover plate 330 has an aperture 335 which is sized and shaped to correspond to the size and shape of the infill plate 340. The cover plate 330 also includes openings $332_1$, $332_2$ for locating screws $334_1$, $334_2$ which can fix the cover plate to the front plate element 320. Other fixing means can of course be utilised for securing the cover to the front plate element.

Figure 4:
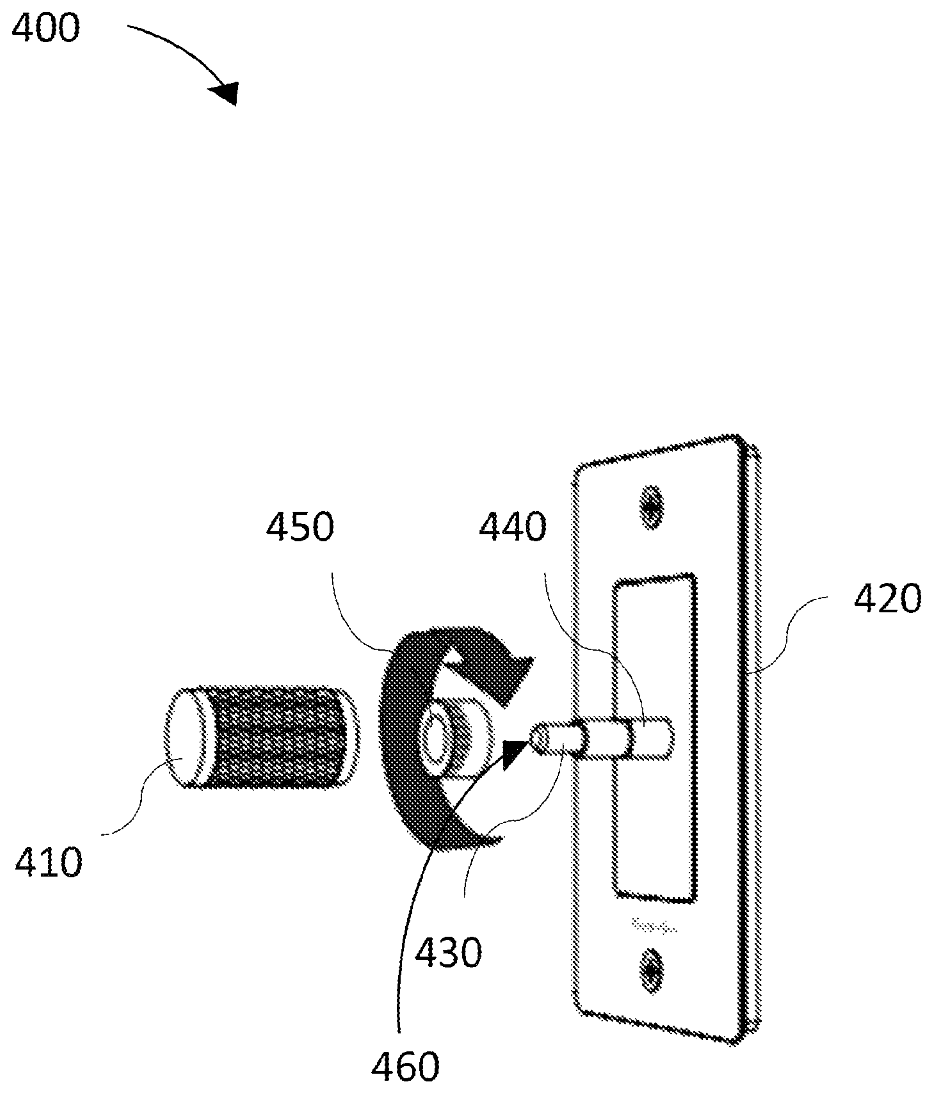
FIG. 4 illustrates an exploded view of how a rotatable knob is arranged on the front cover of a dimmer switch.

FIG. 4 illustrates an arrangement 400 of a rotatable knob element 410 over a front cover 420. The front cover 420 may be the front cover illustrated in FIG. 3. The elongate shaft element 430 protrudes out of the front cover 420. Surrounding the elongate shaft element 430 is a threaded cover portion 440 (best seen in FIG. 2). A nut 450 can be screwed onto the threaded portion for decoration purposes and to secure the module to the cosmetic plate. The rotatable knob 410 can then be pushed onto the end 460 of the elongate shaft element and secured via a compression fit. There is a recess (not shown) in an end surface of the rotatable knob that is shaped to correspond to a shape (best seen in FIG. 2) of the end 460 of the rotatable shaft element such that rotation of the rotatable knob causes corresponding rotation of the elongate shaft element. The fully assembled dimmer module, front cover and rotatable knob may be referred to as a dimmer switch.

Figure 5:
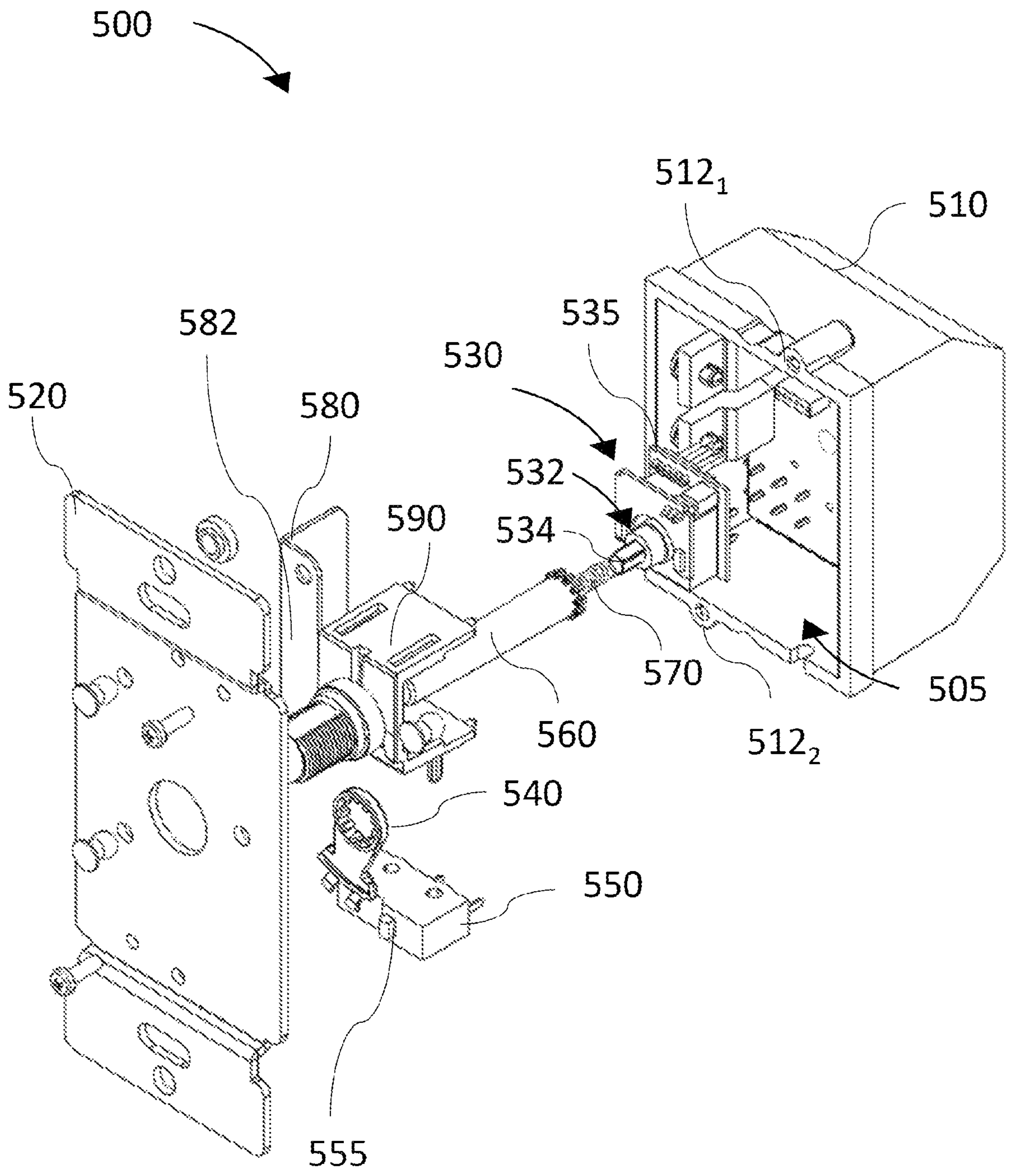
FIG. 5 illustrates an exploded view of a dimmer module of a dimmer switch.

Turning now to FIG. 5, this illustrates an exploded view of a dimmer module 500. The dimmer module may be the dimmer module shown in FIG. 2. The dimmer module has a casing 510 and a front plate element 520 that have been described with reference to FIG. 2. FIG. 5 helps to illustrate the open end 505 of the casing 510 and helps to illustrate the openings $512_1$, $512_2$ in the edge region surrounding the open end of the casing. FIG. 5 also illustrates certain components which are contained within an internal chamber of the dimmer module. These components are at least a module 530 including at least one electronic circuit 535, an actuator element 540, a microswitch 550, part of the elongate shaft element 560, a compression spring 570, a heatsink 580 and part of a threaded cover portion 590.

The electronic circuits 535 within the module 530 are configured to provide an adjustable output power to a light source when the circuits are electrically connected to an input power supply. If no input power supply is electrically connected, then the circuits are not able to provide any output power. To adjust the output power, at least one electronic circuit includes a rotary encoder element 532 that has a rotary element in the form of a rotatable control shaft 534. Rotation of the rotatable control shaft changes the resistance of the rotary encoder element which thereby causes the output power provided to the light source to be changed. This rotary encoder element thus provides the dimmer module with ‘adjustable power functionality’ whereby output power can be continuously adjusted over a predetermined range. The output power provided is an average output power over a predetermined time period. The rotatable control shaft is rotated by rotating the elongate shaft element 560 which itself is rotated by rotating a rotatable knob element (shown in FIG. 4). The rotatable control shaft 534 is sized and shaped to mate with a correspondingly sized and shaped recess (not shown) in a first end of the elongate shaft element 560.

Also included in the electronic circuits 535 is at least one printed circuit board which is electrically connected to the rotary encoder element and which operate in conjunction therewith in order to provide the adjustable output power. Such printed circuit boards and rotary encoder elements are known to a person of skill in the art and are for example available from Advance Dimming Technology Ltd, China.

Within the rotary encoder element there is a tactile switch (not shown), The tactile switch is an example of a second switching element. It will be appreciated that switching elements other than tactile switches may be used according to certain other embodiments of the present invention. The tactile switch sets the output power to zero in a first predetermined state and sets the output power to a predetermined non-zero value (depending on the resistance of the rotary encoder element) in a second predetermined state. Application of a predetermined axial force to the elongate shaft element causes the tactile switch to be actuated. The force may be provided to the elongate shaft element via the rotatable knob element shown in FIG. 4. Application and subsequent removal of this force thus changes the state of the tactile switch. When the tactile switch is in the second predetermined state, rotation of the elongate shaft element (via rotating the rotatable knob) causes the output power provided to a light source to be adjusted as the rotatable control shaft of the rotary encoder element is rotated. The tactile switch has a button that is depressed when the axial force is applied to the tactile switch. To actuate the tactile switch, a predetermined axial force of around 2-9 Newtons is applied. Aptly, a predetermined axial force of around 5-6 Newtons is applied. This tactile switch thus provides the dimmer module with 'on/off functionality' whereby output power can be immediately changed from zero to non-zero, or vice versa.

The microswitch 550 shown in FIG. 5 is configured to electrically disconnect an input power supply from the electronic circuit 535 when it is in a first predefined state and to electrically connect the input power supply to the electronic circuit in a second predefined state. The microswitch is electrically connected between the input power supply and the electronic circuit. The microswitch is thus configured to break or interrupt an electrical connection between the input power supply and the electronic circuit in the first predefined state. The microswitch is an example of a first switching element. As shown in FIG. 5, the microswitch 550 includes a button 555 that can be depressed in order to change the state of the microswitch. The button 555 can be depressed via the actuator element 540 making contact with the button. A predetermined force applied to the button can hold the microswitch in a certain state. If the microswitch is a normally open (N/O) microswitch, then application of a predetermined force to the button closes the microswitch. If the microswitch is a normally closed (N/C) microswitch, then application of a predetermined force to the button opens the microswitch. Either option may be used for the microswitch of the dimmer module illustrated in FIG. 5 depending upon the configuration of the first position and second position of the actuator element 540 as discussed below. Other types of microswitch may of course be utilised according to certain other embodiments of the present invention. It will also be appreciated that other types of switching elements than microswitches may be used according to certain other embodiments of the present invention. Indeed, any switching element that enables switching between two predefined states may be utilised. The microswitch provides the dimmer module with 'separate switch input power interruption' functionality. It will be appreciated that as the microswitch is located within the internal chamber of the dimmer module, it is not visible (i.e., it is hidden) to a user during normal use of a dimmer switch. It will be appreciated that in dimmer modules having more than one elongate shaft element and more than one module housing electronic circuitry, a separate microswitch and associated actuator element may be provided to disconnect input power from each respective module. However, according to certain other embodiments of the present invention, a dimmer module may be provided in which a single microswitch and single actuator element is configured to disconnect an input power supply from all modules housing electronic circuitry within the dimmer module (e.g., two, three or four modules). The microswitch is illustrated in FIG. 5 offset from its' usual position for illustration purposes.

The actuator element 540 is rotatable within the dimmer module between a first position and a second position. The first position may be a position in which the microswitch 550 is not actuated such that there is an air gap above the microswitch and the second position may be a position in which the microswitch is actuated. When the microswitch is a N/C microswitch, then in the first the position the microswitch is in the second predefined state and power is provided to the electronic circuits of the module 530 whereas in the second position the microswitch is in the first predefined state and no input power is supplied to the electronic circuits. Alternatively, the first position may be a position in which the microswitch 550 is actuated and the second position may be a position in which the microswitch is not actuated and there is an air gap above the microswitch. When the microswitch is a N/O microswitch, then in the first position the microswitch is in the second predefined state and input power is provided to the electronic circuits of the module 530 whereas in the second position the microswitch is in the first predefined state and no power is supplied to the electronic circuits. Based on the above, it will be appreciated that whichever position is used for the first position and the second position, rotation of the actuator element between the first position and the second position may cause the microswitch 550 to switch to the first predefined state where no input power is supplied to the electronic circuits of the module 530. An angular displacement of the actuator element between the first position and the second position is around 20-70 degrees. Aptly, the angular displacement is around 35-45 degrees. Aptly, the angular displacement is approximately 39 degrees. The actuator element is described in more detail with reference to FIGS. 6*a*, 6*b*, 6*c* and 6*d*. It will be appreciated that as the actuator element is also located within the internal chamber of the dimmer module behind the front plate element, it is not visible (i.e., it is hidden) to a user during normal use of a dimmer switch. The actuator element is illustrated in FIG. 5 offset from its' usual position for illustration purposes.

The elongate shaft element 560 shown in FIG. 5 is configured to engage the actuator element 540 upon application of a first predetermined force to the elongate shaft element (via the rotatable knob element). The first predetermined axial force is around 10-30 Newtons. Aptly, the first predetermined axial force is around 17-21 Newtons. It will be appreciated that the first predetermined axial force is greater than the second predetermined axial force needed to acuate the tactile switch. The elongate shaft element 560 is described in more detail with reference to FIGS. 8*a*, 8*b*, 8*c* and 8*d*.

The compression spring 570 (an example of a resilient biasing element) is located within a recess of the elongate shaft element that meets with the rotatable control shaft. As a result, the compression spring is disposed between the rotatable control shaft and the elongate shaft element. The compression spring biases the elongate shaft element away from the actuator element such that when no axial force is being applied to the elongate shaft element, there is no engagement between the actuator element and the elongate shaft element. A side view of the compression spring is illustrated in more detail in FIG. 10.

The heatsink 580 is substantially L-shape and has a first portion 582 that abuts the front plate element 520. The heat sink is configured to draw heat generated by the electronic circuits 535 away from the module 530 which is then dissipated by the front plate as one of skill in the art will appreciate.

The threaded cover portion 590 is provided to surround the elongate shaft element 560 such that elongate shaft element protrudes a predetermined distance through a hole in the front plate element and can therefore be connected to a rotatable knob. The threaded cover portion thus ensures that the first end of the elongate shaft element is located in a specific position in the dimmer module when no axial force is being applied to the elongate shaft element.

Figure 6A:
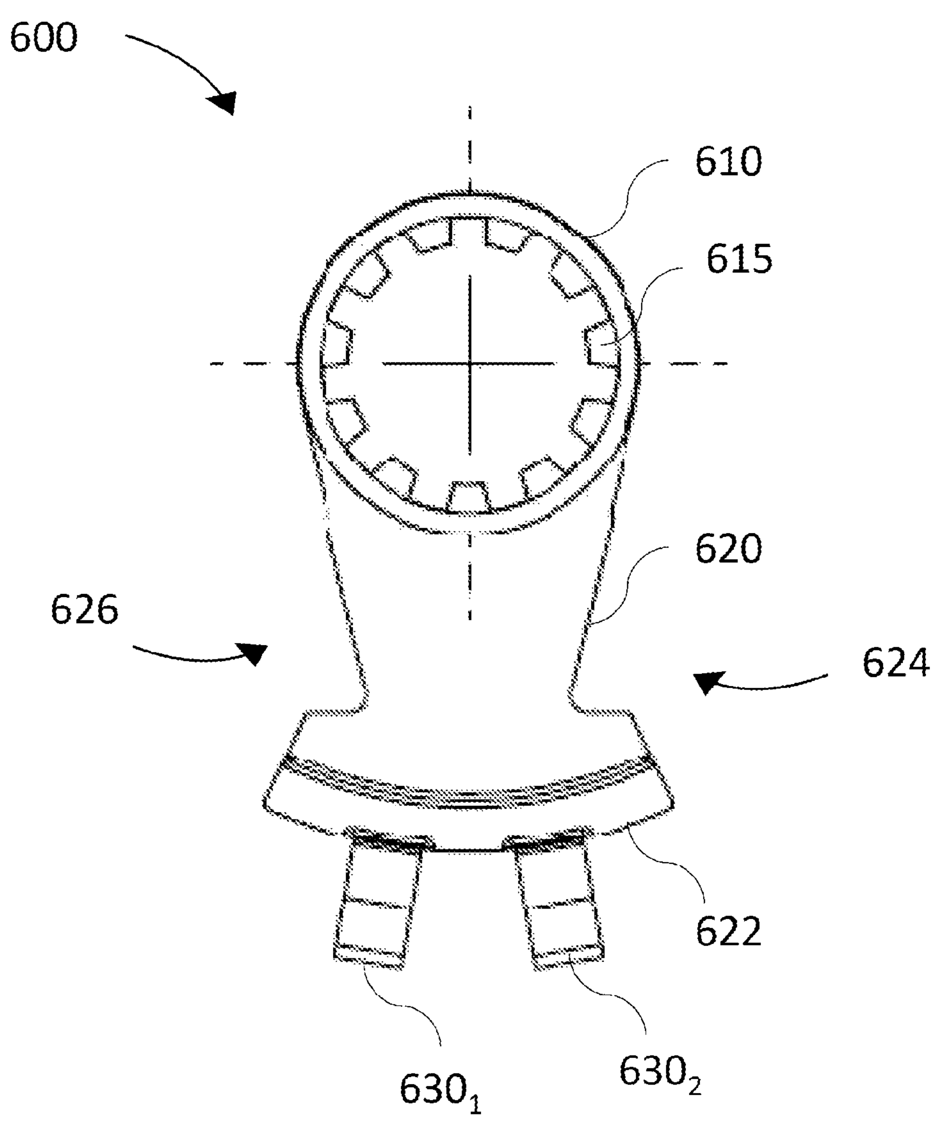
FIG. 6*a* illustrates a top view of the actuator element shown in FIG. 5.

FIG. 6*a* illustrates a top view of an actuator element 600. The actuator element may be the actuator element shown in FIG. 5. The actuator element has a ring portion 610 and a body portion 620 that extends in a radial direction away from the ring portion. The body portion has a curved outer end 622, a first side 624 and a second side 626. An inner surface of the ring portion 610 includes multiple engaging teeth members 615. The engaging teeth members are used to engage with corresponding teeth members of the elongate shaft element. An upper end of the engaging teeth members 615 which faces the elongate shaft element may be radiused in order to assist in the smooth engagement between the actuator element and the elongate shaft element. The radiused teeth are best illustrated in FIG. 12. It will be appreciated that the teeth may also be chamfered or a combination of radiused and chamfered in certain other embodiments of the present invention.

Figure 6B:
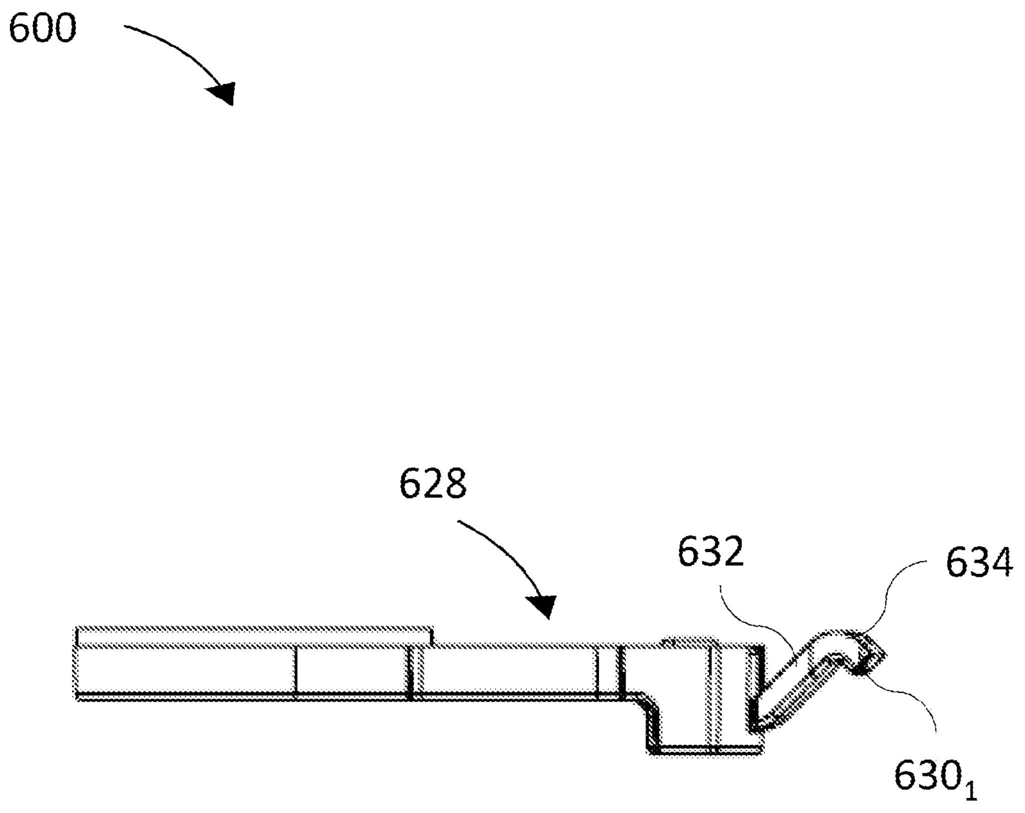
FIG. 6*b* illustrates a side view of the actuator element shown in FIG. 5.

FIG. 6*b* illustrates a side view of the actuator element 600. FIG. 6*b* illustrates a shape of two arm elements $\mathbf{630_1}$, $\mathbf{630_2}$ connected at an end of the body portion 620 opposite the ring portion. In certain other embodiments of the present invention, a different number of arm elements may be used. The arm elements are provided such that they contact a rear surface of the front plate element when the actuator is in the first position and/or the second position. The arm elements also contact/abut the rear surface of the front plate element as the actuator element is rotated. The arm elements help to account for manufacturing tolerances, thus helping to ensure that enough force is provided to actuate the microswitch when the actuator element is in the position in which it contacts the microswitch. Each of the arm elements has the appearance of an inverted V-shape. They each include a sloped pathway portion 632 and a curved connecting portion 634. The curved connecting portion has a rounded outer surface that abuts the rear surface of the front plate element. The sloped pathway portion extends for a predetermined distance such that an upper extremity of the arm element is above a top surface of the body portion of the actuator element. This helps to ensure that the arm elements are in contact with the front plate element.

Figure 6C:
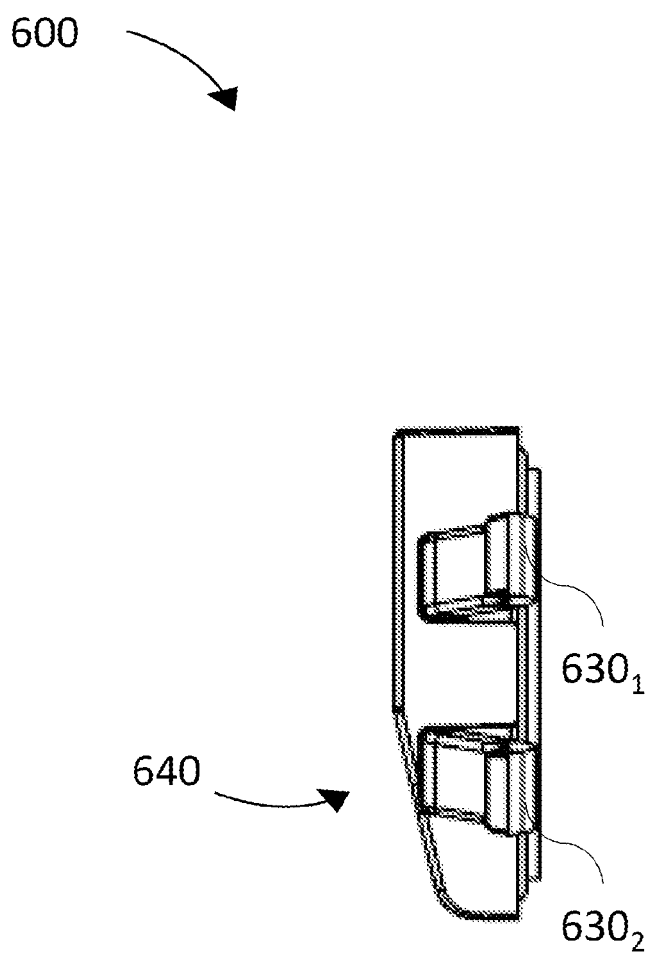
FIG. 6*c* illustrates an end view of the actuator element shown in FIG. 5.
Figure 6D:
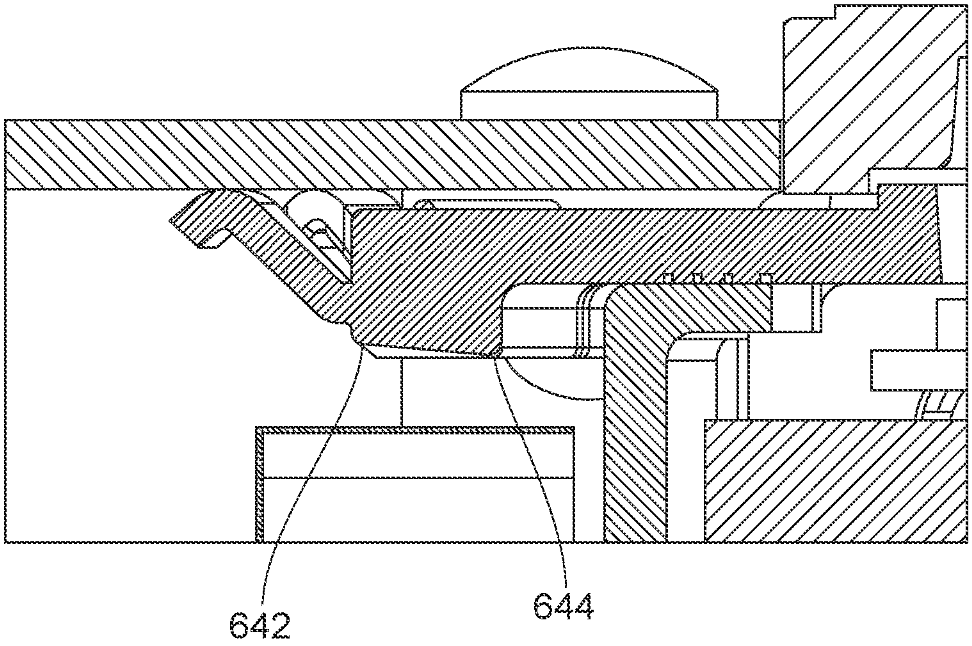
FIG. 6*d* illustrates an inclined region of the riding surface.

FIG. 6*c* illustrates an end view of the actuator element 600. FIG. 6*c* illustrates how the body portion includes a riding surface 640 that contacts the microswitch element when the actuator element is in a certain position. The depth of the body portion between its top surface 628 and the riding surface 640 increases between the first side 624 and the second side 626 of the body portion. In more detail, the depth between the top surface of the body portion and the riding surface is substantially constant for a predetermined distance between the second side and the first side and then continuously decreases for a remainder of the distance between the second side and the first side. Part of the riding surface is also oriented at an angle of around 0 to 25 degrees with respect to the top surface of the body portion. This may be referred to as an inclined region of the riding surface. Aptly the riding surface is inclined at an angle of 0 to 14 degrees to the top surface of the body portion. The riding surface is angled such that a first edge 642 of the riding surface which is closest to the ring portion is closer to the top surface than a second edge 644 of the riding surface that is further away from the ring portion. This is best illustrated in FIG. 6*d*. Providing a changing depth and/or an inclined riding surface helps to ensure that the microswitch is smoothly actuated by the actuator element as the actuator element is rotated and helps to prevent snagging of the actuator element.

Figure 7:
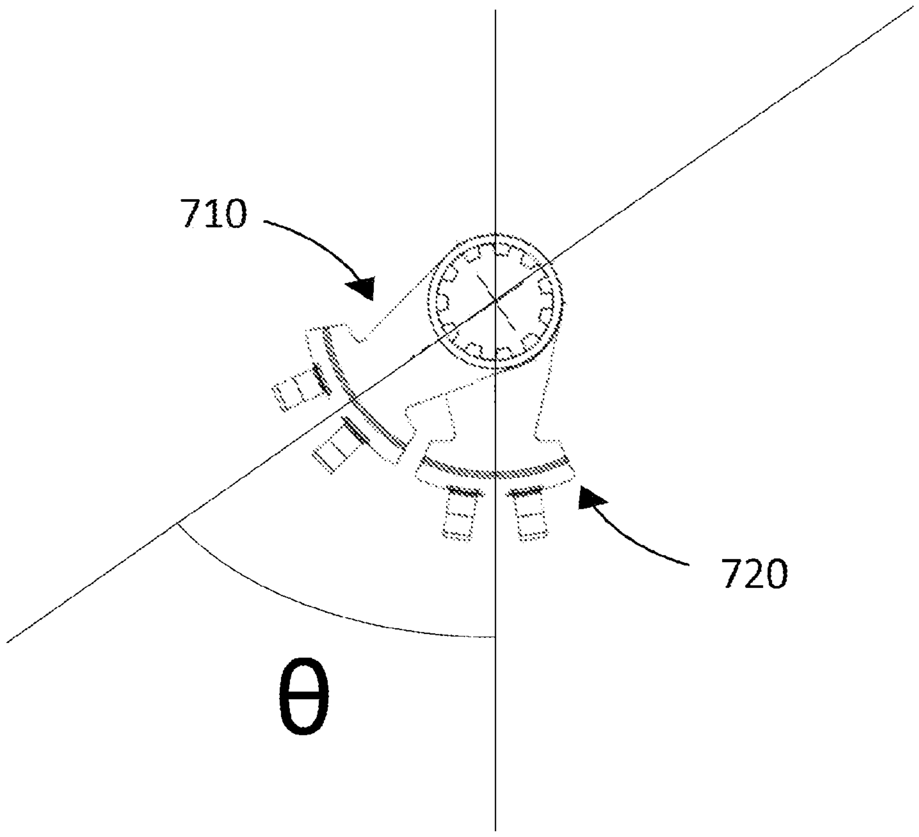
FIG. 7 illustrates an angular displacement of the actuator element between a first position and a second position.

FIG. 7 helps to illustrate an angular displacement of the actuator element between a first position and a second position. The actuator element 710 is in the first position. The actuator element 720 is in the second position. The angular displacement between these positions is defined by θ. The angular displacement is thus the angular rotation of any point on the actuator element about its axis of rotation. As noted above, the angular displacement between the first position and the second position is around 20-70 degrees. Aptly, the angular displacement is around 35-45 degrees. Aptly, the angular displacement is around 39 degrees.

Figure 8A:
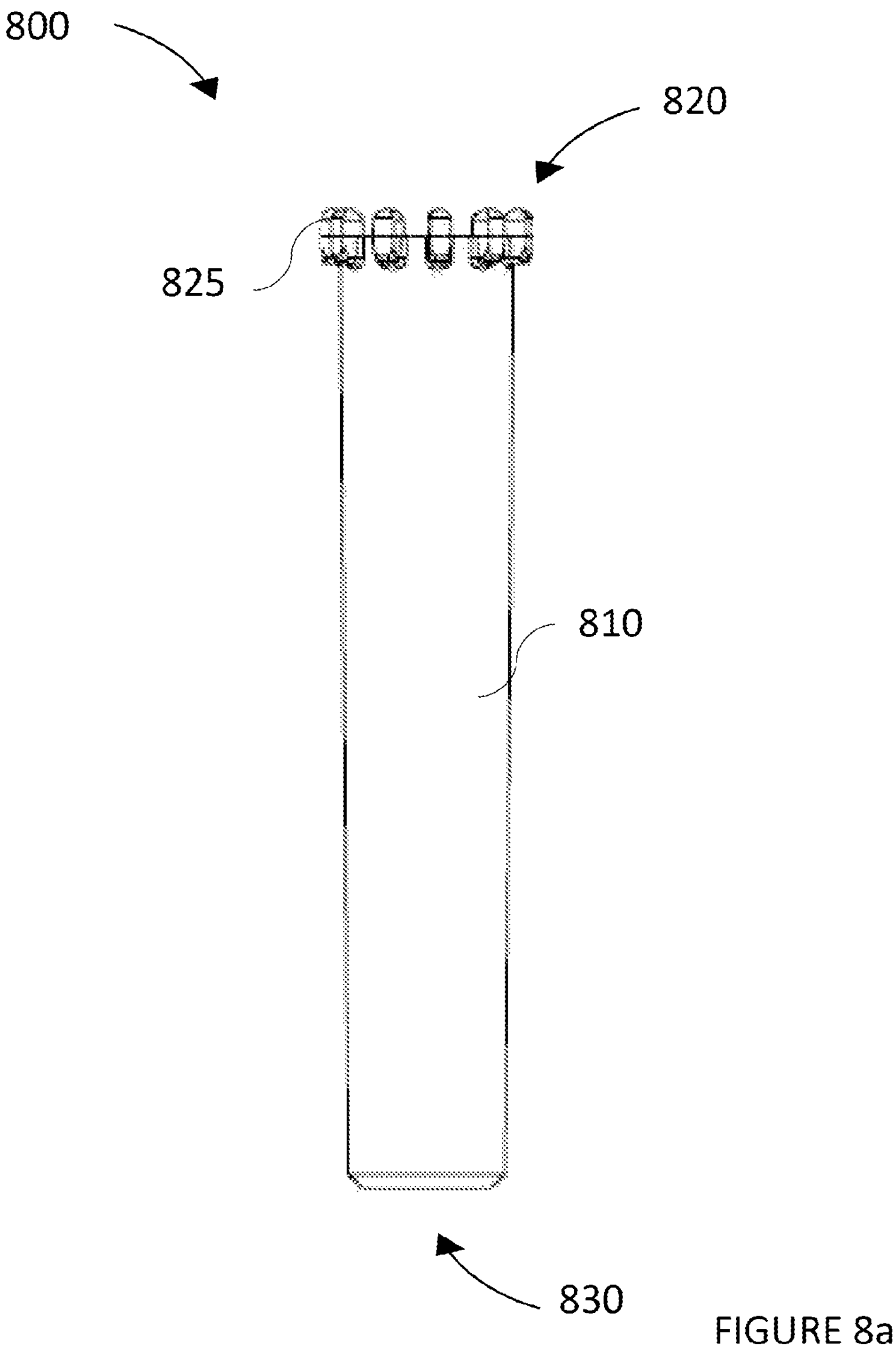
FIG. 8*a* illustrates a side view of the elongate shaft element shown in FIG. 5.

FIG. 8*a* illustrates a side view of an elongate shaft element 800. The elongate shaft element may be the elongate shaft element shown in FIG. 2. As shown in FIG. 8*a*, the elongate shaft element includes a main body 810 having a first end 820 and a further end 830. At the first end, the elongate shaft element has multiple engaging teeth members 825. The engaging teeth members 825 are arranged around an outer surface of the first end. Each of the engaging teeth members are chamfered at an end of the teeth members which faces the actuator element. This chamfering is illustrated in more detail in FIG. 8*d*. The chamfered ends of the teeth members helps to ensure smooth engagement between the elongate shaft element and the actuator element and helps to prevent snagging. However, it will be appreciated that in certain other embodiments of the present invention, no chamfering may be used. The teeth members 825 extend a predetermined distance beyond an end surface of the first end of the main body in a direction towards the actuator element. This ensures the engaging teeth members of the elongate shaft element can engage with the teeth members of the actuator element which are located on an inner surface of a ring portion. The further end 830 is connectable to a rotatable knob such as the one shown in FIG. 4.

Figure 8B:
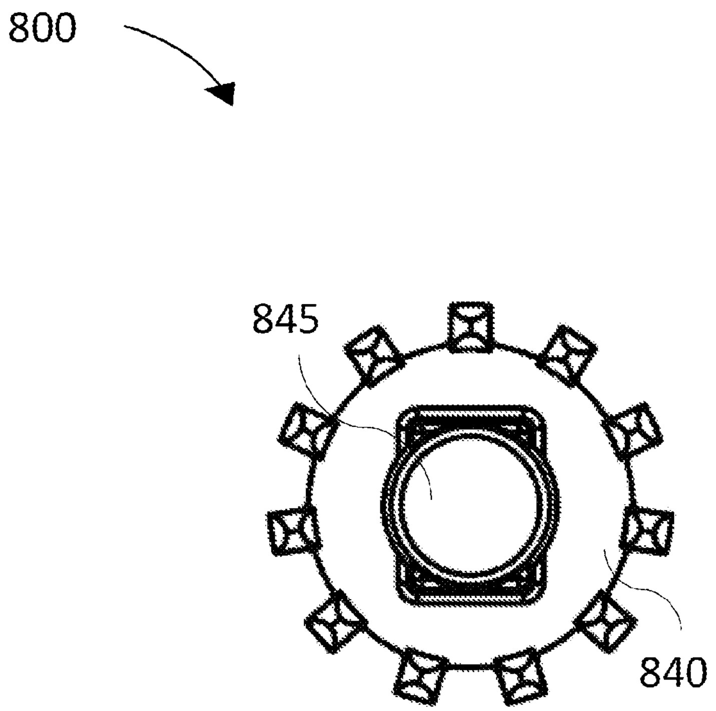
FIG. 8*b* illustrates a view of the first end of the elongate shaft element shown in FIG. 8*a;*

FIG. 8*b* illustrates a view of the first end 820 of the elongate shaft element 800. As can be seen in FIG. 8*b*, the end surface 840 at the first end of the main body includes a recess 845 which has a particular size and shape. The size and shape of the recess is made to correspond to the size and shape of a rotatable control shaft of the rotary encoder element shown in FIG. 5. The shape of the recess is also shown in FIG. 8*d*. The corresponding shape of the rotatable control shaft is illustrated in FIG. 9*b*. As noted above, the compression spring is also disposed in this recess 845 such that the elongate shaft element is biased away from the actuator element when no axial force is being applied to the elongate shaft element.

Figure 8C:
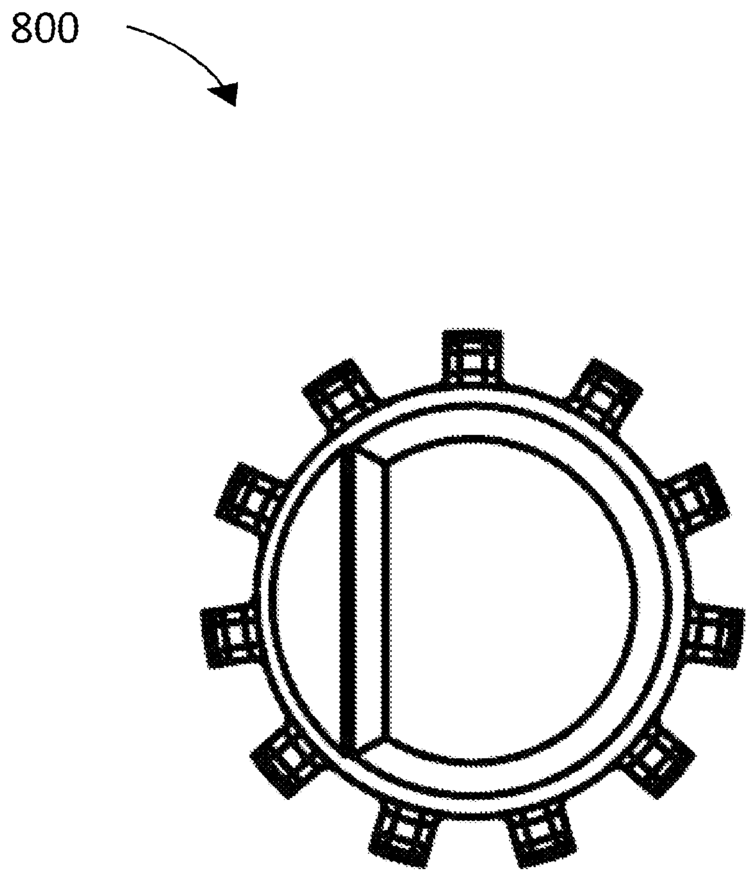
FIG. 8*c* illustrates a view of the further end of the elongate shaft element shown in FIG. 8*a;*
Figure 8D:
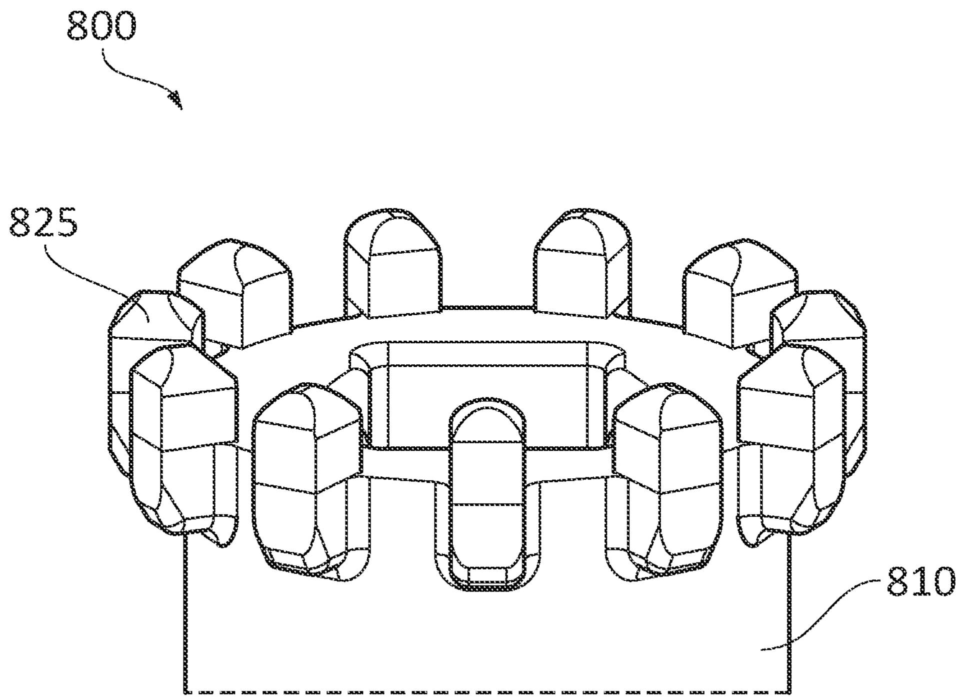
FIG. 8*d* illustrates a close-up view of the first end of the elongate shown element shown in FIG. 5.

FIG. 8*c* illustrates a view of the further end 830 of the elongate shaft element 800. FIG. 8*c* helps to illustrate how the further end has a particular size and shape such that it mates with a corresponding sized and shaped recess (not shown) in a rotatable knob. This ensures that rotation of the rotatable knob causes rotation of the elongate shaft element.

Figure 9A:
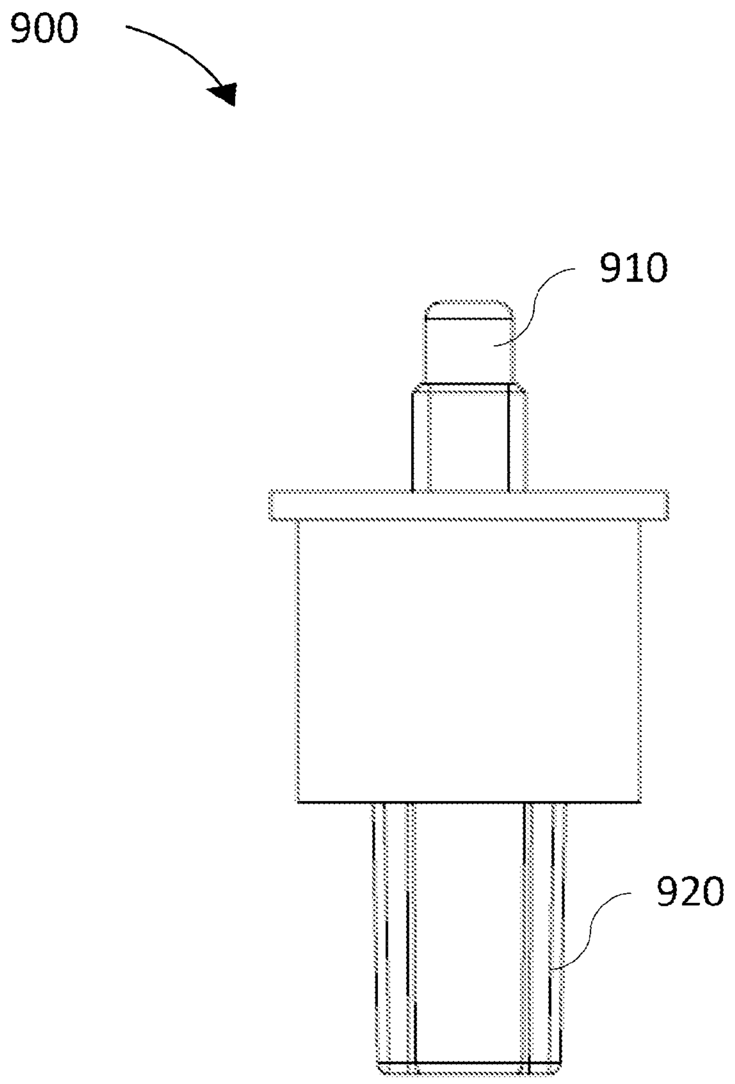
FIG. 9*a* illustrates a side view of the rotary encoder element shown in FIG. 5.
Figure 9B:
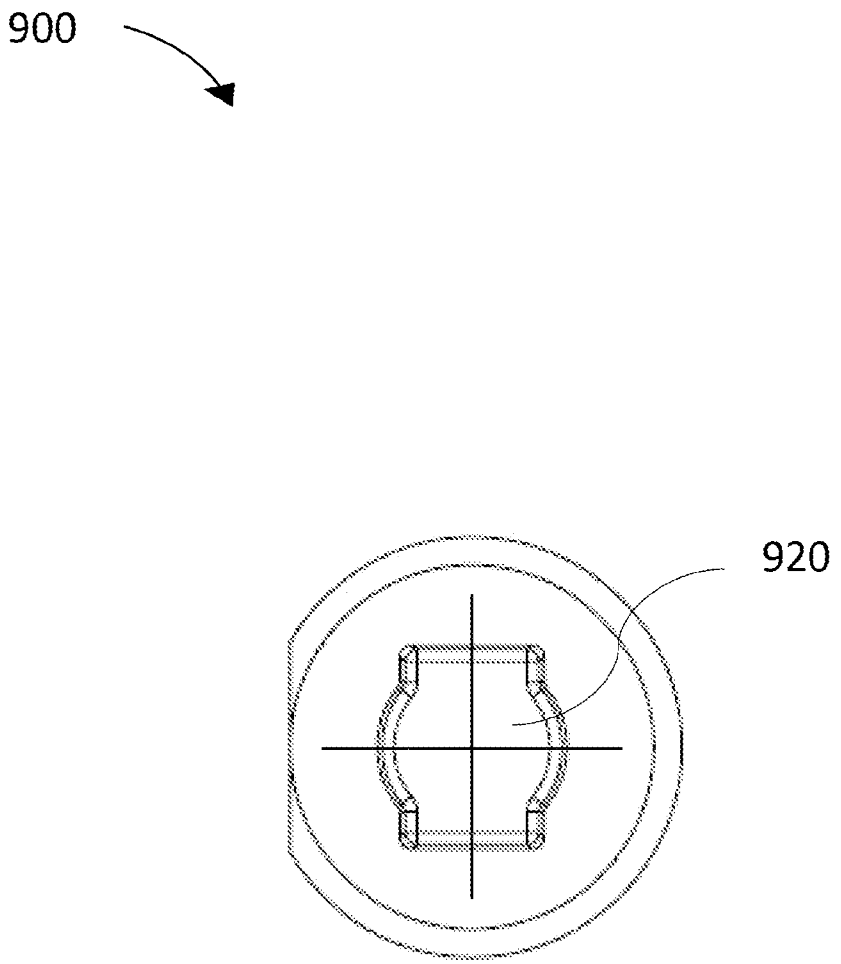
FIG. 9*b* illustrates a top view of the rotary encoder element shown in FIG. 9*a;*

FIG. 9*a* illustrates a side view of the rotary encoder element 900. The rotary encoder element includes a rotatable control shaft 920 that as discussed is sized and shaped to mate with a recess in the elongate shaft element. The size and shape of the control shaft is best illustrated in FIG. 9*b*. The rotary encoder element 900 also includes a base portion 910. The tactile switch is located within the rotary encoder and is actuated when a predetermined axial force is applied to the rotatable control shaft.

Figure 10:
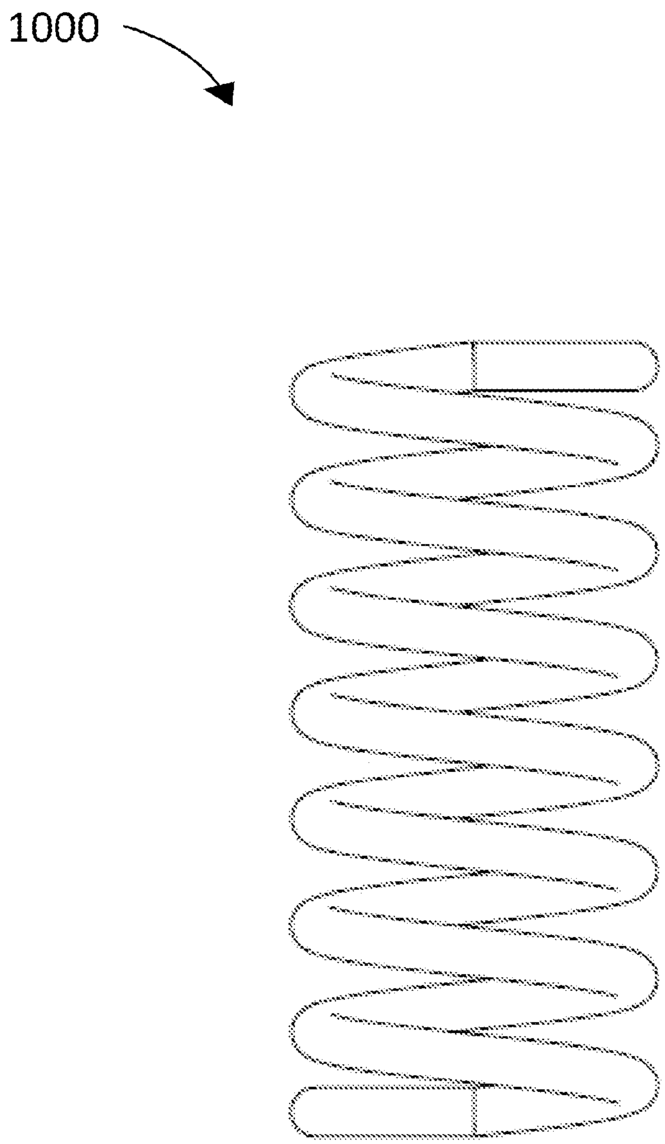
FIG. 10 illustrates a side view of the compression spring shown in FIG. 5.

FIG. 10 illustrates a side view of a compression spring 1000 which is located in the recess of the elongate shaft element and biases the elongate shaft element away from the actuator element in the absence of external forces being applied.

Figure 11:
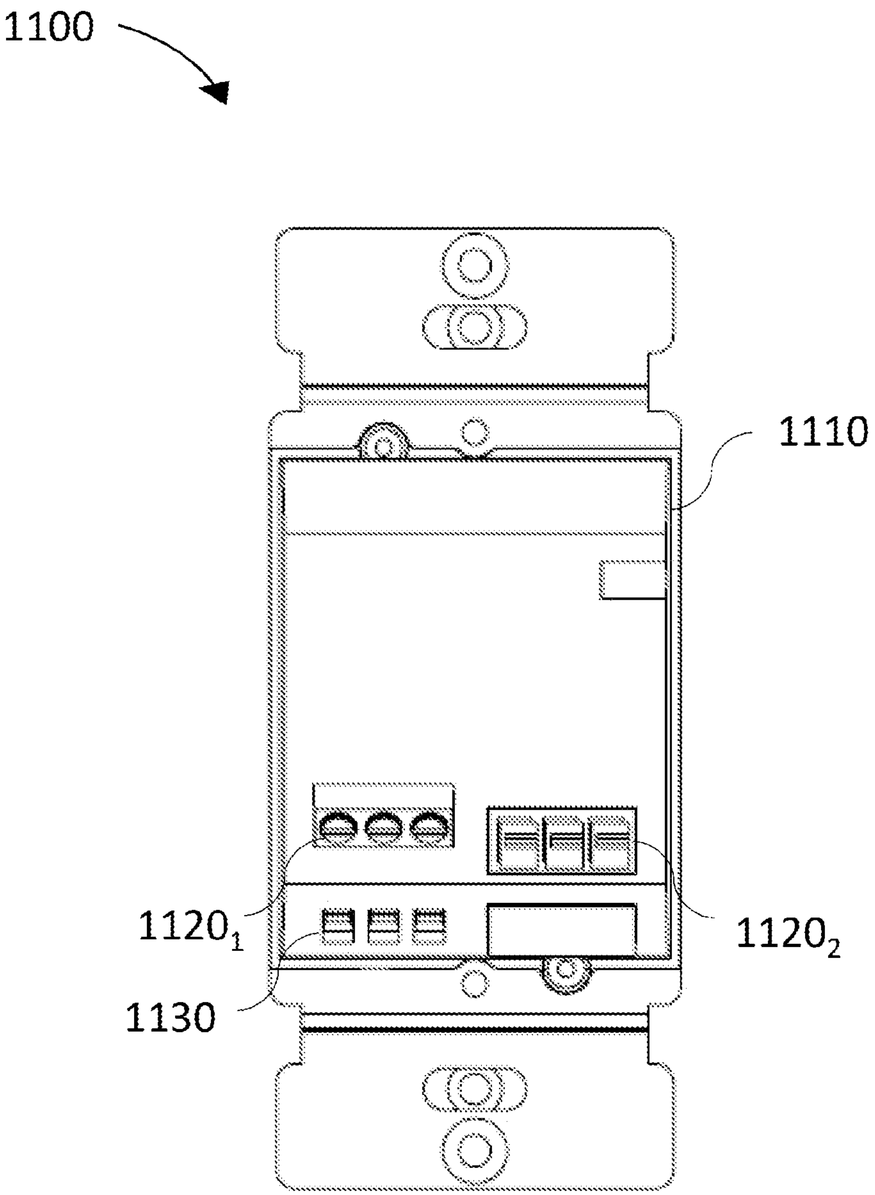
FIG. 11 illustrates a rear view of a dimmer module of a dimmer switch.
Figure 12A:
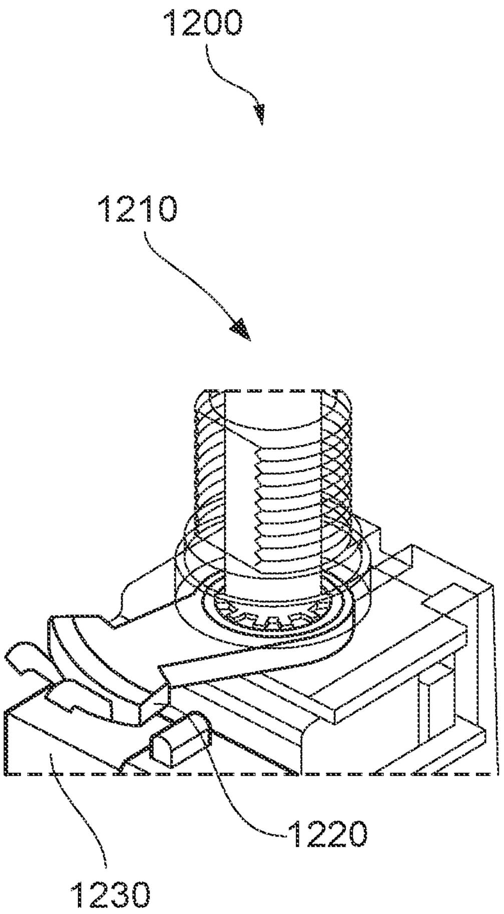
FIGS. 12*a*-12*d* illustrate a process diagram for rotating an actuator element of the dimmer module of FIG. 5 from a first position to a second position.
Figure 12B:
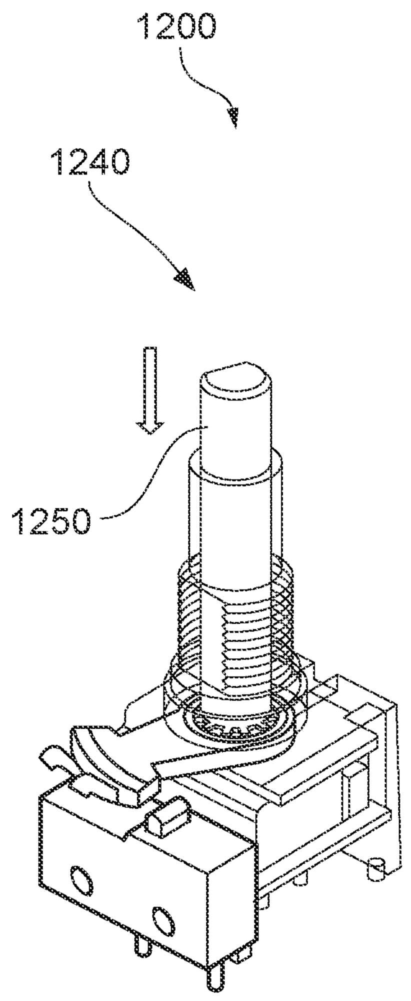
Figure 12C:
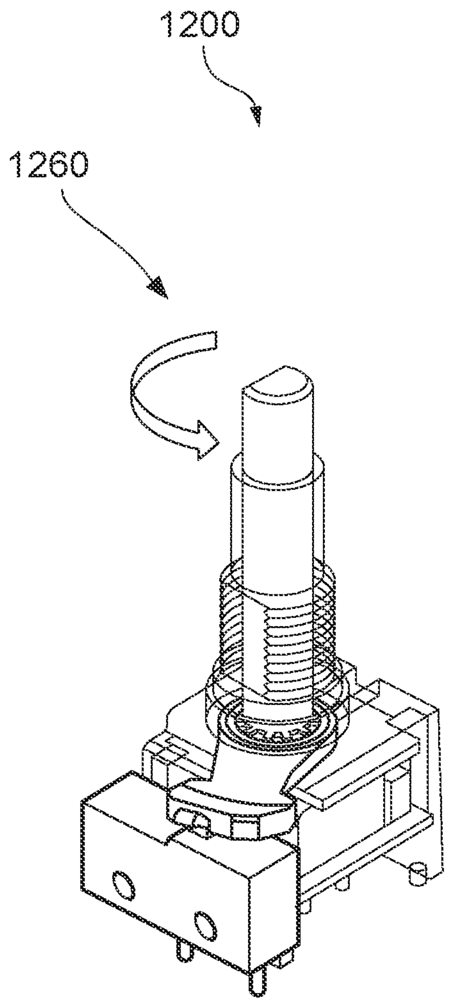
Figure 12D:
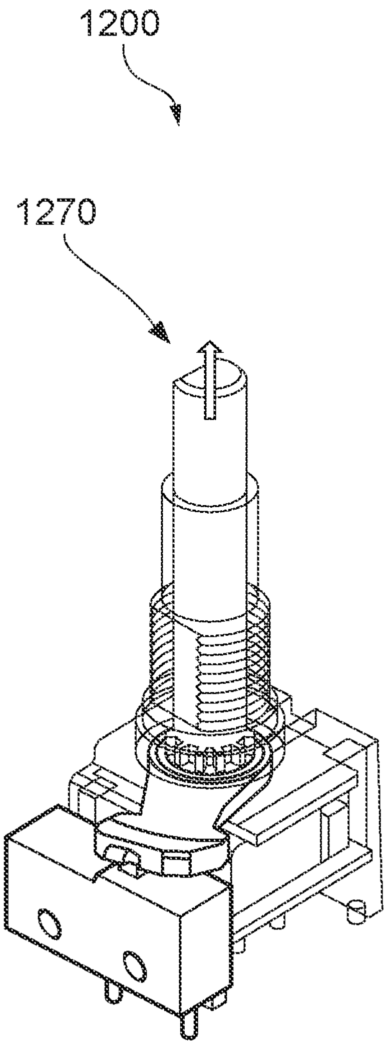

FIG. 11 illustrates a rear view of a dimmer module 1100. The dimmer module may be the dimmer module as illustrated in FIG. 2 or 5. The rear view shows a rear of the casing 1110 of the dimmer module. Located within the casing are three first electrical connectors $\mathbf{1120_1}$ and three second electrical connectors $1120_2$. One or more of the first electrical connectors and second electrical connectors can be connected to an input power supply (not shown) that supplies input power to the dimmer module. That is to say that either the first electrical connectors or the second connectors are connected to the input power supply. These different connectors provides the installer with an option of using either push fit or screw fit connections. Within the dimmer module, the first/second electrical connectors are electrically connected to an input of a microswitch (not shown). The output of the microswitch is connected to at least one input power connector element of the module that includes the electronic circuitry. As a result, the first/second electrical connectors are electrically connectable to the input power connector elements. The state of the microswitch determines whether there is an electrical connection. The electrical connections between these components may be provided via cabling or via a pin and socket configuration. Located within the casing are three third electrical connectors 1130. One or more of the third electrical connectors can be connected to an output power supply (not shown) that supplies power to an external electric component such as a light source from the dimmer module. Within the dimmer module, the third electrical connectors are electrically connected to corresponding output power connector elements of the module that includes the electronic circuitry. This electrical connection may be provided via cabling or via a pin and socket configuration.

FIGS. 12*a*-12*d* illustrate a process flow diagram 1200 for breaking an electrical connection between an input power supply and an electronic circuit within a dimmer module. In the first stage 1210, illustrated in FIG. 12*a*, the actuator element 1220 is in a first position in which it is not contacting the microswitch 1230. As a result, there is an air gap above the microswitch. In FIG. 12, the microswitch is a N/C microswitch and as such, in the first stage 1210, power is provided from the input power supply to the electronic circuits of the dimmer module (via the microswitch). In a second stage 1240, illustrated in FIG. 12*b*, a first predetermined axial force is applied to the elongate shaft element 1250 (e.g., via a rotatable knob) such that the elongate shaft element engages with the actuator element. In a third stage 1260, illustrated in FIG. 12*c*, whilst the first predetermined axial force is being applied, the elongate shaft element is rotated anticlockwise by around 40 degrees. This thereby causes the actuator element (which is in engagement with the elongate shaft element) to rotate by around 40 degrees. The actuator element is thus rotated to a second position. In this second position, the actuator element is contacting the microswitch 1230. As a result, the actuator element depresses a button on the microswitch which changes the state of the microswitch (opens the microswitch). This change of state causes the microswitch to disconnect all incoming power from the input power supply from the electronic circuits within the dimmer module. In a fourth stage 1270, illustrated in FIG. 12*d*, the first predetermined axial force is removed from the elongate shaft element, thus resulting in the elongate shaft element and actuator element disengaging. However, since the actuator element has been rotated to the second position, power still does not reach the electronic circuits of the dimmer module. To provide power back to the electronic circuits, the process is carried out in reverse. That is to say that the first predetermined axial force is applied to the elongate shaft element, the elongate shaft element and thus the actuator element are rotated clockwise by around 40 degrees, and then the first predetermined axial force is removed.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for controlling an output power provided to at least one electrical component, comprising:

at least one module comprising at least one electronic circuit for providing an output power, adjustable via rotation of at least one rotary element, to at least one electrical component when the electronic circuit is electrically connected to an input power supply that supplies power to the electronic circuit;

at least one first switching element configured to electrically disconnect at least one of said at least one electronic circuit from the input power supply when the at least one first switching element is in a first predefined state; and at least one actuator element that is rotatable between a first position and a second position and that is configured to switch a respective first switching element to the first predefined state when rotated from the first position to the second position, wherein the at least one actuator element comprises a body portion that comprises a riding surface configured to contact the respective first switching element when the at least one actuator element is in the first position or the second position.

2. The apparatus as claimed in claim 1, wherein an angular displacement between the first position and the second position is around 20-70 degrees.

3. The apparatus as claimed in claim 1, wherein a depth between a top surface of the body portion and the riding surface increases between a first side and a second side of the body portion.

4. The apparatus as claimed in claim 1, wherein the apparatus is a dimmer switch and wherein the electronic component is a light source.

5. The apparatus as claimed in claim 1, wherein:

the first position is a position in which the respective first switching element is not actuated such that there is an air gap above the respective first switching element and the second position is a position in which the respective first switching element is actuated; or the second position is a position in which the respective first switching element is not actuated such that there is an air gap above the respective first switching element, and the first position is a position in which the respective first switching element is actuated.

6. The apparatus as claimed in claim 1, wherein the at least one rotary element is a rotatable control shaft of at least one rotary encoder element comprised within the electronic circuit.

7. The apparatus as claimed in claim 1, further comprising:

at least one rotatable elongate shaft element that is engageable with a respective actuator element;

wherein the actuator element is rotatable by rotating the rotatable elongate shaft element after engagement of the rotatable elongate shaft element with the actuator element.

8. The apparatus as claimed in claim 7, wherein the rotatable elongate shaft element is configured to engage the actuator element upon application of a first predetermined axial force to the rotatable elongate shaft element.

9. The apparatus as claimed in claim 8, wherein the first predetermined axial force is a force of from 10-30 N.

10. The apparatus as claimed in claim 7, wherein the rotatable elongate shaft element comprises a main body portion comprising a first end and a further end, the rotatable elongate shaft element further comprising a plurality of first engaging teeth members arranged around an outer surface of the first end of the main body portion.

11. The apparatus as claimed in claim 10, wherein the plurality of first engaging teeth members are chamfered at an end of each of the first engaging teeth members which faces the actuator element.

12. The apparatus as claimed in claim 1, wherein the actuator element comprises a ring portion.

13. The apparatus as claimed in claim 12, wherein the body portion extends away from the ring portion in a radial direction.

14. The apparatus as claimed in claim 13, wherein the riding surface is inclined at an angle of 0 to 25 degrees with respect to a top surface of the body portion such that a first edge of the riding surface closest to the ring portion is closer to the top surface than a second edge of the riding surface furthest from the ring portion.

15. The apparatus as claimed in claim 13, wherein the actuator element further comprises at least one arm element connected at an end surface of the body portion opposite to the ring portion.

16. The apparatus as claimed in claim 15, wherein the at least one arm element is configured to abut a surface of a front plate element to thereby apply a predetermined force to the first switching element when the at least one actuator element is in the first position or second position.

17. A method for controlling an output power provided to at least one electrical component, the method comprising the steps of:

rotating an actuator element from a first position to a second position; and responsive to the rotating, switching a first switching element to a first predefined state; and responsive to the switching, electrically disconnecting an input power supply from at least one electronic circuit that is configured to provide an output power, adjustable via at least one rotary element, to at least one electrical component, wherein the actuator element comprises a body portion that comprises a riding surface configured to contact the first switching element when the actuator element is in the first position or the second position.

18. The method as claimed in claim 17, further comprising:

prior to rotating the actuator element, applying a first predetermined axial force to a rotatable elongate shaft element, and thereby engaging the rotatable elongate shaft element with the actuator element; and upon engagement of the rotatable elongate shaft element with the actuator element, rotating the actuator element from the first position to the second position.

19. The method as claimed in claim 17, wherein rotating comprises rotating the actuator element by around 20-70 degrees.

* * * * *